(12) United States Patent  (10) Patent No.: US 8,371,404 B2
Boeckler  (45) Date of Patent: Feb. 12, 2013

(54) SELF-PROPELLED POOL SERVICE CART WITH SULKY

(76) Inventor: Darron Boeckler, Oakland Park, FL (US)

( * ) Notice: Subject to any disclaimer, the term of this patent is extended or adjusted under 35 U.S.C. 154(b) by 237 days.

(21) Appl. No.: 12/826,946

(22) Filed: Jun. 30, 2010

(65) Prior Publication Data

US 2011/0000731 A1 Jan. 6, 2011

Related U.S. Application Data

(60) Provisional application No. 61/222,219, filed on Jul. 1, 2009.

(51) Int. Cl.
*B60K 1/00* (2006.01)
(52) U.S. Cl. .................. 180/65.1; 180/214
(58) Field of Classification Search ............ 180/65.1, 180/65.31, 65.265, 13, 220, 233, 19.3, 214, 180/208, 213
See application file for complete search history.

(56) References Cited

U.S. PATENT DOCUMENTS

| 2,867,449 | A |   | 1/1959  | Shawver |
| 2,962,106 | A |   | 11/1960 | Burnside et al. |
| 3,150,735 | A |   | 9/1964  | Kaufman |
| 3,219,137 | A | * | 11/1965 | Appleton ............... 180/65.1 |
| 3,485,314 | A |   | 12/1969 | Herr |
| 3,565,199 | A |   | 2/1971  | Mistarz |
| 3,566,985 | A | * | 3/1971  | Triplett ............... 180/65.1 |
| 3,834,726 | A |   | 9/1974  | Hobza |
| 3,891,043 | A |   | 6/1975  | Valdex |
| 3,952,822 | A | * | 4/1976  | Udden et al. .............. 180/216 |
| D253,638  | S |   | 12/1979 | Killingsworth |
| 4,192,525 | A |   | 3/1980  | Clark |
| 4,469,191 | A | * | 9/1984  | Truninger ............... 180/233 |
| 4,828,282 | A |   | 5/1989  | Pinto |
| 4,878,339 | A |   | 11/1989 | Marier et al. |
| 4,928,227 | A | * | 5/1990  | Burba et al. ............. 180/65.265 |
| 5,004,251 | A |   | 4/1991  | Velke et al. |
| 5,018,890 | A |   | 5/1991  | May |
| 5,101,920 | A |   | 4/1992  | Peterson |
| 5,118,123 | A |   | 6/1992  | Betrock |
| 5,283,507 | A | * | 2/1994  | Stitt et al. ............... 318/376 |
| 5,657,828 | A |   | 8/1997  | Nagamachi |
| 6,173,799 | B1 | * | 1/2001 | Miyazaki et al. ............ 180/19.3 |
| 6,409,186 | B2 |   | 6/2002 | Bennington |
| 6,497,422 | B1 |   | 12/2002 | Bellis, Jr. |
| 6,692,010 | B1 |   | 2/2004 | Johnson et al. |
| 6,889,784 | B2 | * | 5/2005 | Troll ............... 180/13 |

(Continued)

*Primary Examiner* — Hau Phan
(74) *Attorney, Agent, or Firm* — Mark D. Bowen; Malin Haley DiMaggio Bowen & Lhota P.A.

(57) ABSTRACT

A self-propelled pool service cart specifically adapted for transporting a battery powered pool cleaning vacuum powered by an on-board rechargeable battery, along with other pool cleaning equipment and accessories. The cart is adapted an electric motorized transaxle with integrated transmission for powering the cart wheels. The electric motor receives power from the rechargeable battery that is used to power the vacuum. The cart is adapted with a handle assembly that includes a thumb actuated throttle that allows the user to selectively control the speed of the cart. In an alternate embodiment, a wheeled platform or sulky is provided for removable attachment to the cart in trailing configuration. The wheeled platform includes a pole mount for removably receiving a telescopic pool cleaning pole therein when in operation. A self-propelled cart in accordance with the present invention may be used either with or without the wheeled platform. The cart is further adapted for simple attachment and removal to a vehicle.

7 Claims, 6 Drawing Sheets

U.S. PATENT DOCUMENTS

| | | |
|---|---|---|
| 7,467,801 B1 | 12/2008 | Garduno |
| 7,874,388 B2 * | 1/2011 | Ranger ......................... 180/65.1 |
| 2006/0143844 A1 * | 7/2006 | Klucznik ........................ 15/50.1 |
| 2008/0077285 A1 * | 3/2008 | Kumar et al. .................... 701/19 |
| 7,134,515 B2 | 11/2006 | Lenkman |
| 7,163,213 B2 | 1/2007 | Chambers |
| 7,210,545 B1 | 5/2007 | Waid |
| 7,228,925 B2 * | 6/2007 | Hightower ................... 180/65.1 |

* cited by examiner

SELF-PROPELLED POOL SERVICE CART WITH SULKY

CROSS REFERENCE TO RELATED APPLICATIONS

This application claims the benefit of provisional U.S. patent application Ser. No. 61/222,219 filed on Jul. 1, 2009.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to utility carts, and more particularly to a self-propelled pool service cart for transporting pool cleaning and service equipment, and an optional sulky for transporting a pool service technician.

2. Description of Related Art

Utility carts come in a wide variety of designs for use in countless applications. The present invention is primarily directed to pool carts particularly adapted for use by swimming pool service technicians. Swimming pool service technicians, also commonly referred to as "pool men", clean pools and service major pool equipment such as pumps, motors, and filters. Pool service technicians commonly use simple push carts to transport pool service equipment, materials, and supplies while servicing swimming pools. Such material may include pool chemicals such as chlorine and muriatic acid, a telescopic pole with interchangeable brush and debris collection net heads, and a pool vacuum apparatus. As a result, the prior art discloses utility carts particularly adapted for use by swimming pool service technicians.

For example, U.S. Pat. No. DES. 253,638, issued to Killingsworth, discloses an ornamental design for a basic pool equipment cart. Furthermore, U.S. Pat. No. 4,240,174, issued to Thiem et al. discloses a self-contained mobile pool cleaning apparatus for swimming pools that includes a self-contained pump and filter mounted on a hand wheeled utility cart. The apparatus disclosed by Thiem et al., however, is equipped with a unnecessary equipment, such as a 5800 GPH pump, a large (4.0 HP) motor for driving the pump, and a bank of cartridge filters for on-board filtering of the water. Due to the excessive weight accompanying said equipment, the card disclosed by Thiem is far to heavy for use by pool service technicians who often must transport the cart to and from approximately 20-30, or more, pools per day.

Since swimming pool service technicians typically clean between 20 to 30 pools per day, there has existed a demand for improvements in the design of pool service carts, equipment and accessories. One such advancement has been the development of battery powered pool cleaning vacuums that include an electrically driven impeller powered by a rechargeable battery to draw water through the vacuum, thereby eliminating the need for pumps and hoses while decreasing weight. An example of such a swimming pool vacuum is found in U.S. Pat. No. 5,768,734, which discloses a submersible vacuum head formed of a housing having opposing symmetrical halves. A further advancement, includes forming the vacuum head housing from a single, vacuum molded piece. The use of such battery powered vacuums has increased greatly in recent years. In addition, pool service carts have been adapted for quick and easy mounting to the rear of a pick-up truck to allow for rapid deployment and stowage.

Despite such advancements, the swimming pool service technician must manually push the carts back and forth from the truck to the pool. The physical strain of having to manually propel the pool service cart is physically draining on the technician, and time consuming. Accordingly, there exists the need for an improved pool service cart for use by swimming pool technicians. In addition, there exists a need for a pool service cart that is self-propelled to reduce physical strain on the technician while increasing the speed with which the technician can travel between his truck and the swimming pool, and/or between customer locations. It is, therefore, to the effective resolution of the aforementioned problems and shortcomings of the prior art that the present invention is directed. In view of the pool service cart and methods of construction in existence at the time of the present invention, it was not obvious to those persons of ordinary skill in the pertinent art as to how the identified needs could be fulfilled in an advantageous manner. The instant invention addresses this unfulfilled need in the prior art by providing an improved, self-propelled pool service cart that overcomes the limitations and disadvantages present in the art.

BRIEF SUMMARY OF THE INVENTION

The present invention is directed to a self-propelled pool service cart specifically adapted for transporting a battery powered pool cleaning vacuum powered by an on-board rechargeable battery, along with other pool cleaning equipment and accessories. The cart is adapted an electric motor with integrated transmission for powering the cart wheels. The electric motor receives power from the rechargeable battery that is used to power the vacuum. The cart is adapted with a handle assembly that includes a thumb actuated throttle that allows the user to selectively control the speed of the cart. In an alternate embodiment, a wheeled platform or sulky is provided for removable attachment to the cart in trailing configuration. The wheeled platform preferably comprise a light-weight cart having two wheels and a surface upon which the operator may stand while driving the cart. The trailer may include a pole mount for removably receiving a telescopic pool cleaning pole therein when in operation. A self-propelled cart in accordance with the present invention may be used either with or without the wheeled platform. The cart is further adapted for simple attachment and removal to a vehicle.

Accordingly, it is an object of the present invention to provide a self-propelled pool service cart.

Another object of the present invention is to provide such a cart wherein a single battery is used to provide power to propel the cart as well as for powering an electrically powered pool vacuum.

Still another object of the present invention is to provide a self-propelled pool service cart adapted with a trailer for allowing the operator to ride along.

These and other objects are met by the present invention which will become more apparent from the accompanying drawing and the following detailed description of the drawings and preferred embodiments.

BRIEF DESCRIPTION OF THE SEVERAL VIEWS OF THE DRAWINGS

Preferred embodiments of the invention will now be described in farther detail. Other features, aspects, and advantages of the present invention will become better understood with regard to the following detailed description and accompanying drawings (which are not to scale) where.

DETAILED DESCRIPTION OF THE INVENTION

While the present disclosure may be susceptible to embodiment in different forms, the drawings show, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

Figure 1:
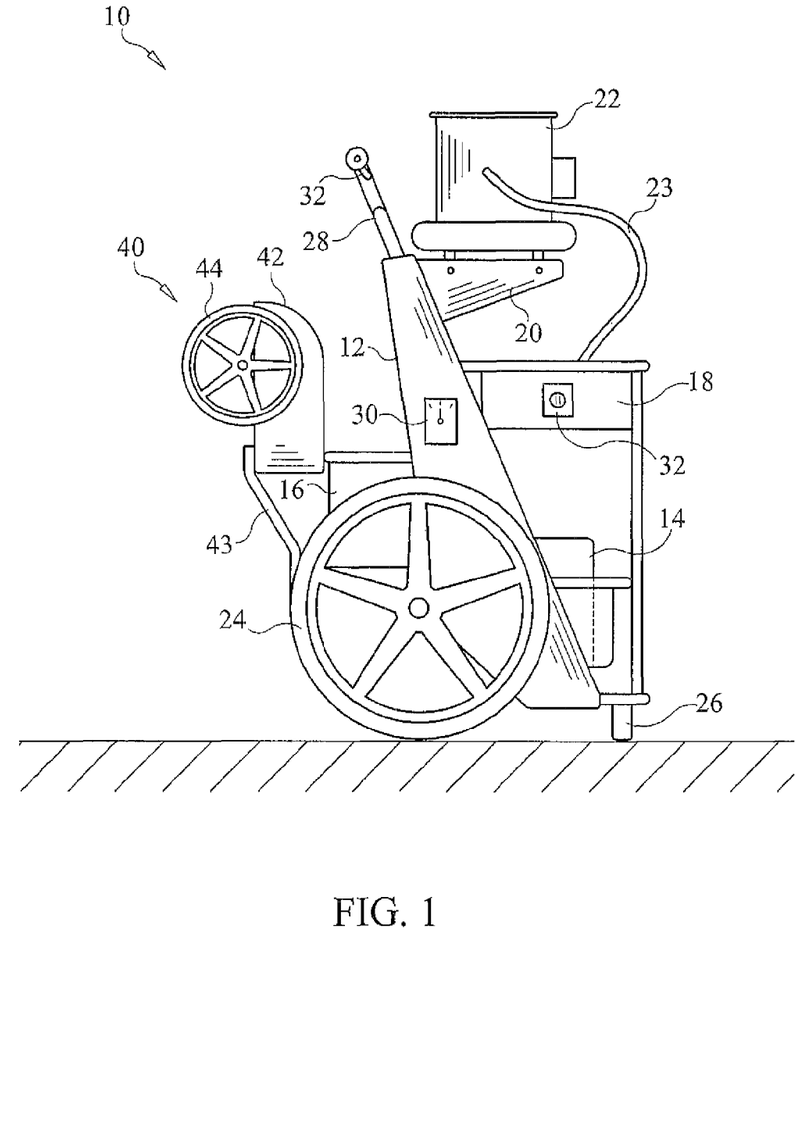
FIG. 1 is a side view of a self-propelled pool service cart with sulky in a stowed configuration in accordance with the present invention.
Figure 2:
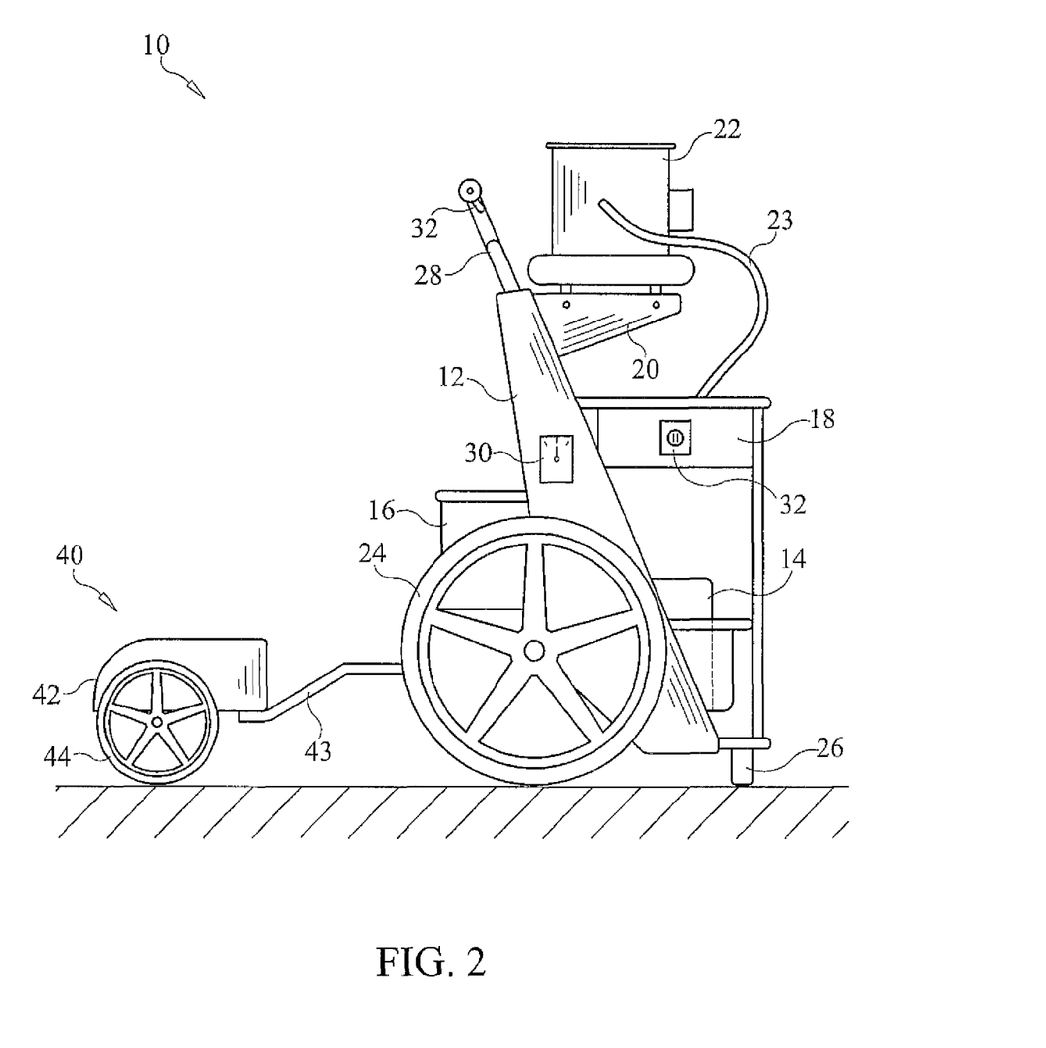
FIG. 2 is a side view thereof with the sulky in a deployed configuration.
Figure 3:
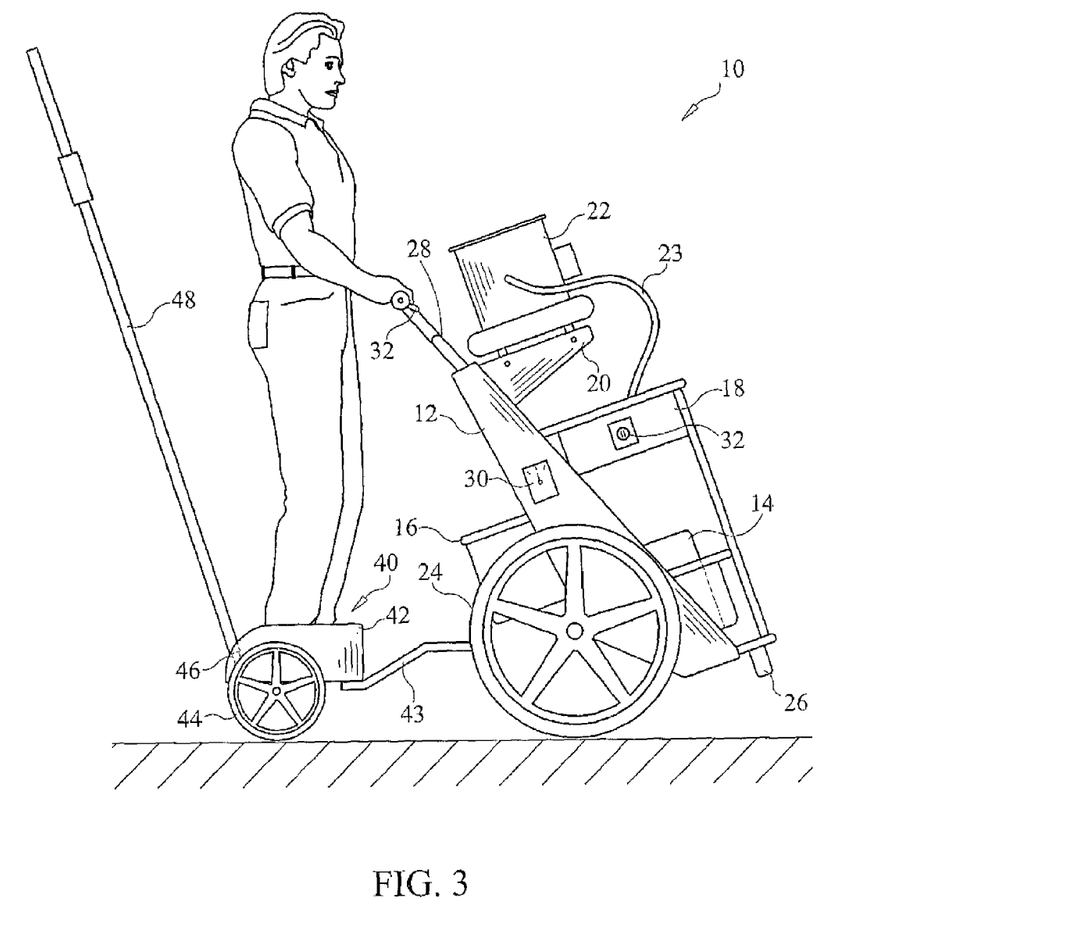
FIG. 3 is a side view thereof illustrating moving operation thereof under the control of a rider/operator disposed on the sulky.
Figure 4:
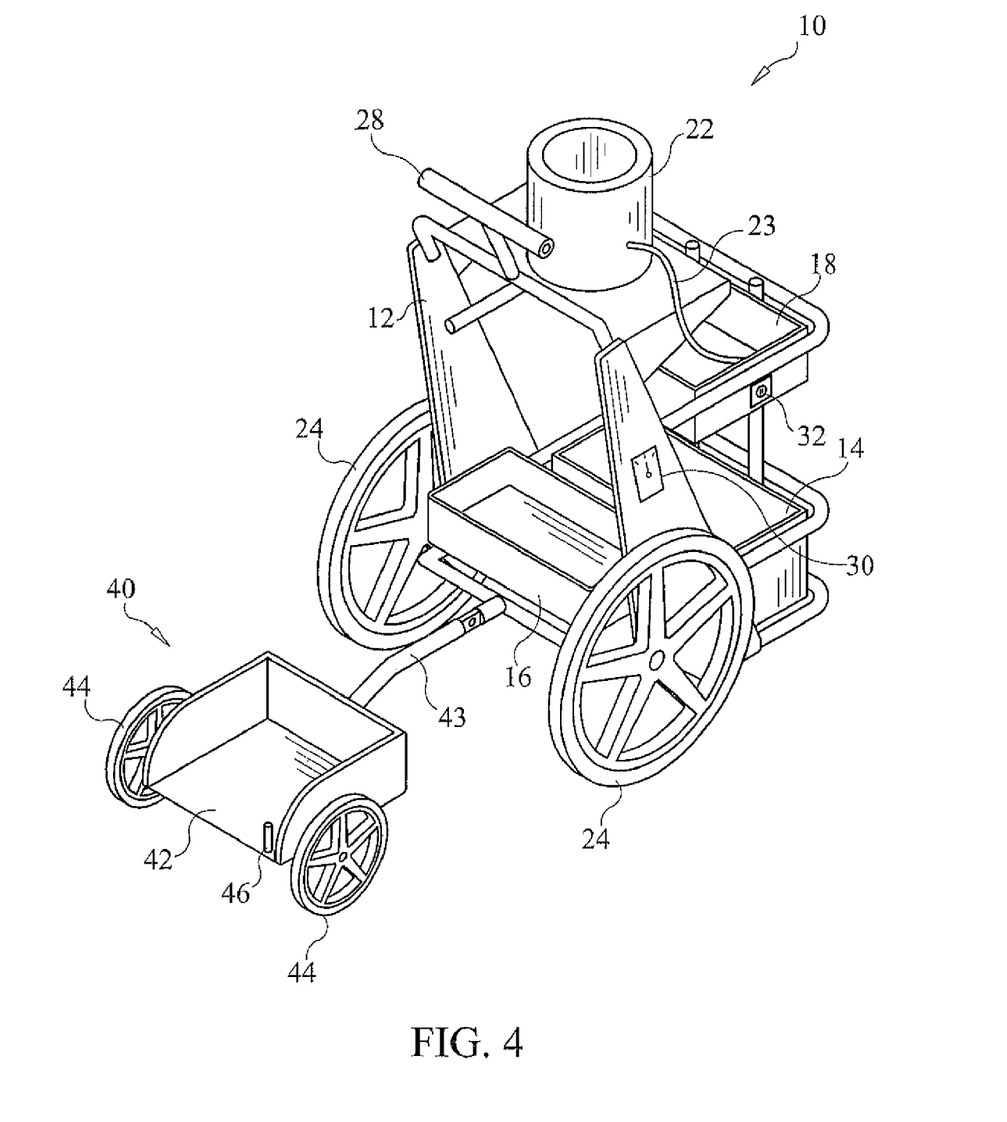
FIG. 4 is a top perspective view.
Figure 5:
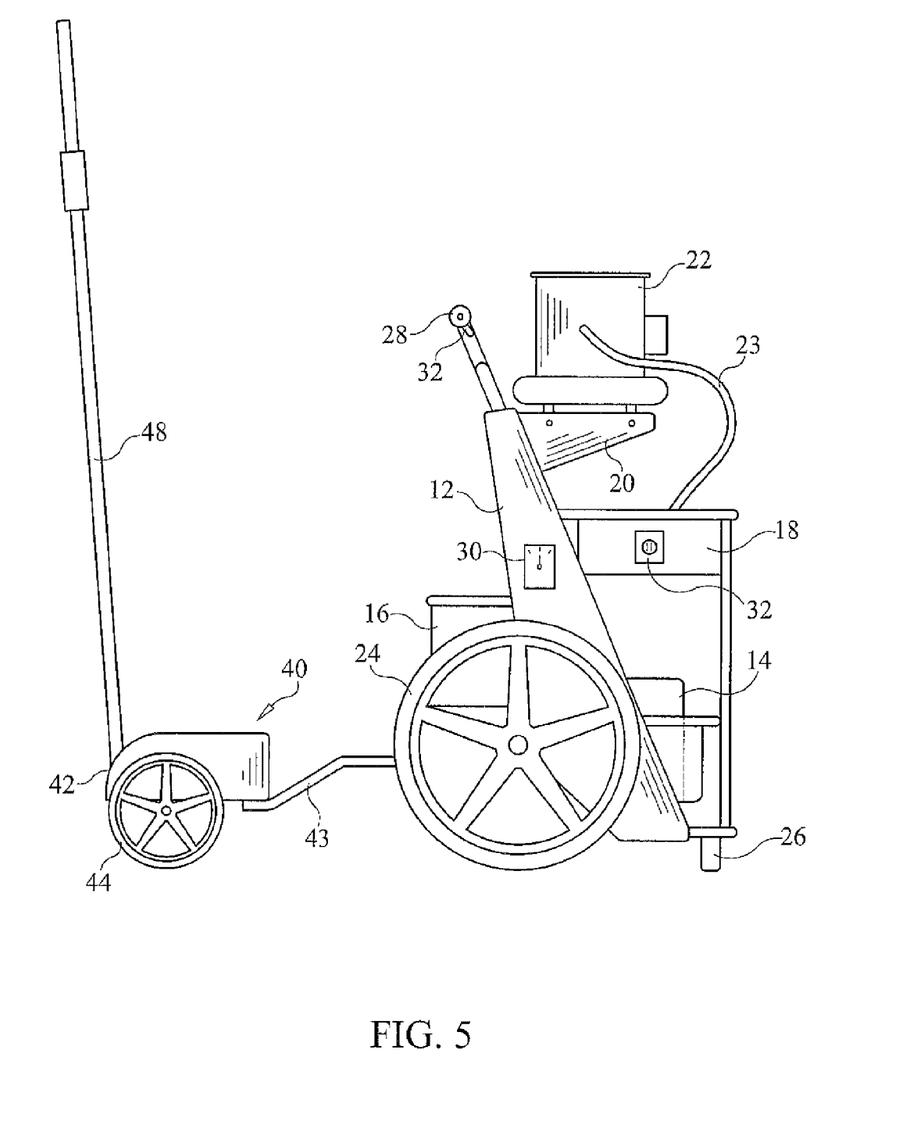
FIG. 5 is a side view thereof illustrating a telescopic pole removably installed on the sulky; and, FIG. 6 is an electrical schematic and block diagram for a self-propelled pool service cart in accordance with a preferred embodiment of the present invention.
Figure 6:
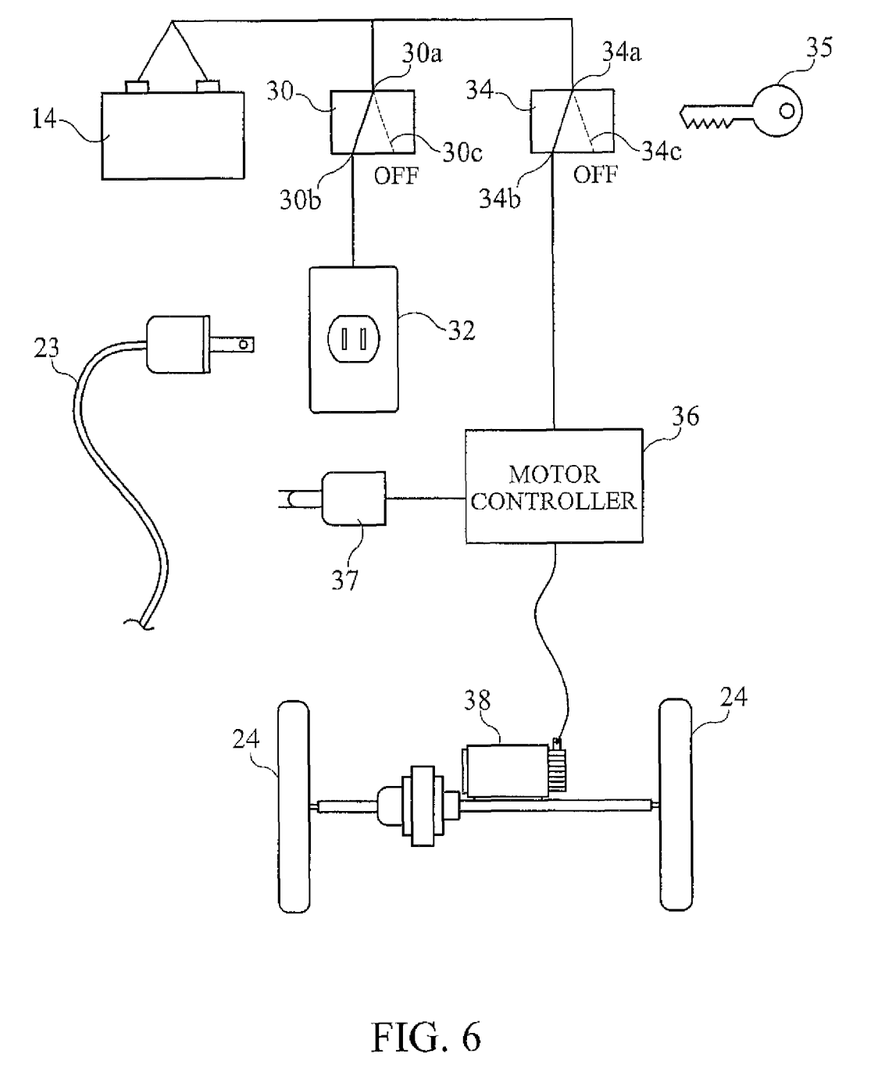

With reference now to the drawings, FIGS. 1-6 depict, there is depicted a pool service cart, generally referenced as 10, which is specifically adapted for transporting a battery powered pool cleaning vacuum powered by an on-board rechargeable battery, along with other pool cleaning equipment and accessories. Self-propelled cart 10 includes a main body frame 12, which is preferably fabricated from tubular powder coated steel. Frame 12 is further adapted to receive a rechargeable battery 14, first and second storage bins, referenced as 16 and 18 respectively, and storage platform 20 upon which an electrically powered submersible pool vacuum 22 may be mounted. Storage platform 20 preferably includes a top surface molded for nested mating engagement with the undersurface of pool vacuum 22 so as to function to secure pool vacuum 22 during transit. More particularly, the top surface of platform 20 includes upwardly projecting structure sized and shaped to be received within by a pool vacuum 22 when the pool vacuum is disposed on top of platform 20. Battery 14 is preferably a high capacity 12-Volt (12V) rechargeable battery that functions to provide power as more fully discussed herein, and in one particular mode to power pool vacuum 22 when in use. Bin 16 provides storage space for pool chemicals and/or other apparatus, and bin 18 provides storage for an electric power cord 23 that provides power for an impeller (not shown) mounted within submersible pool vacuum 22. Frame 12 further includes a pair of wheels 24 journaled for rotation relative to a rear portion of frame 12, a pair of downwardly projecting legs 26 to support frame 12 in a generally vertically standing position when not in motion. A handle 28 is disposed in proximity to the top of the frame. Pool service cart 10 is preferably used by a pool service technician to transport pool cleaning equipment and supplies from location to location, and while battery 14 functions to provide power for the electrically powered pool vacuum 22. As more fully discussed herein, battery 14 is electrically connected to an electrical receptacle 32 via a first manual switch 30. First manual switch 30 preferably comprises a single pole, single throw, on/off switch having an input 30a in electrical communication with battery 14, a first outlet 30b electrically connected to electrical receptacle 32 (e.g. "on" position), and a second outlet 30c forming an open circuit (e.g. "off" position). Electrical power is provided to pool vacuum 22 by plugging power cord 23 into receptacle 32 and configuring switch 30 to the "on" position thereby placing receptacle 32 in electrical communication with battery 14 via switch outlet 30b, as schematically illustrated in FIG. 6.

A significant aspect of the present invention involves providing a self-propelled pool service cart that reduces physical strain on the technician while increasing the speed with which the technician can travel between his truck and the swimming pool, and/or between customer locations. This aspect of the invention is accomplished by providing cart 10 with an electrically powered motorized transaxle assembly 38 mounted to frame 12. Electric motorized transaxle assembly 38 preferably comprises a DC motor mechanically connected to an axel via suitable gears. Electric motorized transaxle assembly 38 is mechanically connected to wheels 24, and electrically connected to battery 14. In a preferred embodiment, electric motorized transaxle assembly 38 comprises a 24V, 500 W DC motor system that further includes automatic magnetic brake that automatically engages when power input is reduced to zero to slow the cart to a stop. It has been found that providing 12 VDC power to a 24 VDC electric motorized transaxle assembly provides adequate power to generate a brisk yet safe operating speed. Accordingly, a maximum speed less than approximately 15.0 mph is achieved. Electric motorized transaxle assembly 38 is preferably electrically connected to battery 14 via a keyed switch 34, via a motor controller 36. A thumb actuated speed control 37 in mounted on handle 28 and wired to a motor controller 36 to regulate the speed of the motor. While the preferred embodiment of the invention discloses the use of a thumb actuated speed control mounted on the handle, any suitable speed control device and mounting configuration is considered within the scope of the present invention. For example, an alternate embodiment, may include a foot pedal speed control mounted on a sulky. Further the speed control may be mounted to support structure other than the frame. Second manual switch 34 preferably comprises a single pole, single throw, on/off switch that requires a key 35 for actuation. Second manual switch 34 includes an input 34a in electrical communication with battery 14, a first outlet 34b electrically connected motor controller 36 (e.g. "on" position), and a second outlet 34c forming an open circuit (e.g. "off" position). Electrical power is provided to motor controller 36 upon insertion of key 35 into second switch 34 and configuring switch 34 to the "on" position, as schematically illustrated in FIG. 6.

A further significant aspect of the present invention thus involves the use of battery 14 to power both a submersible pool vacuum 22 as well as the electric motorized transaxle 38 in order to propel pool service cart 10 to and from pool locations. The use of a single battery to provide electrical power to both the cart (when in self-propelled mode) and to power a submersible pool vacuum (in pool cleaning mode) provides a cart that is compact, fast and efficient.

In a first mode of use, pool service cart 10 may be propelled in a walk-behind mode with the operator (pool service technician) simply walking behind the cart while steering using handle 28 and controlling the speed using speed control 37. This mode significantly reduces physical stress on the pool service technician as the pool cart propels itself while being guided by the user. Another advantage realized in the walk-behind mode is that the initial application of power to wheels 24 functions to automatically partially tip the cart into position for travel. More particularly, the operator grasps handle 28 and applies power using speed control 37 thereby causing wheels 24 to rotate thereby moving the lower portion of the cart away from the user such that legs 26 raise off the ground, whereafter the user simply walks in a trailing position controlling both the speed and direction of the cart using handle 28 and speed control 37.

Yet another significant aspect of the present invention involves providing cart 10 with a lightweight wheeled platform or sulky, generally referenced as 40, that is capable of removable attachment to cart 10 in a trailing configuration for towing the operator in a second mode of use. Sulky 40 preferably comprise a light-weight body 42 having a tow bar 43 projecting forwardly therefrom and a pair of wheels 44 disposed on opposing sides thereof journaled for rotation about an axis. Sulky body 42 provides a platform upon which the user may stand while driving the cart. In a preferred embodiment, sulky 40 includes a pole mount 46 projecting generally upward and rearward from body 42. Pole mount 46 functions to removably receive a telescopic pool cleaning pole 48 therein when in operation. Providing a pole mount 46 on sulky 40 positions the pole away from cart frame 12 and behind the operator such that the long telescopic pole may be carried in a position that does not interfere with the turning and handling of cart 10. More particularly, it has been found that mounting a telescopic pole to frame 12 in a generally vertical configuration may put the pole in a position that interferes with steering, particularly tight or sharp turning. Sulky 40 is preferably adapted for upward pivotal movement and locking attachment to frame 12 in a compact configuration when not in use.

As noted above, a significant aspect of the present invention thus involves the use of battery 14 to power the electric motorized transaxle assembly 38 to propel pool service cart 10 to and from pool locations, and to power electrically powered pool vacuum 22. FIG. 6 depicts a simple wiring schematic wherein battery 14 is in electrical communication with first manual switch 30 having an input 30a in electrical communication with battery 14, a first outlet 30b electrically connected to electrical receptacle 32 (e.g. "on" position), and a second outlet 30c forming an open circuit (e.g. "off" position). Electrical power is provided to pool vacuum 22 by plugging power cord 23 into receptacle 32 and configuring switch 30 to the "on" position thereby placing receptacle 32 in electrical communication with battery 14 via switch outlet 30b. Second manual switch 34 includes an input 34a in electrical communication with battery 14, a first outlet 34b electrically connected motor controller 36 (e.g. "on" position), and a second outlet 34c forming an open circuit (e.g. "off" position). Electrical power is provided to motor controller 36 upon insertion of key 35 into second switch 34 and configuring switch 34 to the "on" position, as schematically illustrated in FIG. 5. In a preferred embodiment, speed may be incrementally controlled between a full stop (e.g. 0 mph) up to approximately 10.0 mph.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A self-propelled pool service cart comprising:
a frame including a handle;
an electrical power source consisting of a single 12-Volt battery mounted on said frame;
a first electrical control switch having an electrical input in electrical communication with said battery, and first and second electrical outputs corresponding to said first electrical control switch, said first electrical control switch including a manually actuated selector configurable between a first position wherein said electrical input is placed in electrical communication with an electrical receptacle, a second position wherein said electrical input configured to an open circuit corresponding to an off-configuration;
a second electrical control switch having an electrical input in electrical communication with said battery, and first and second electrical outputs corresponding to said second electrical control switch, said second electrical control switch including a manually actuated selector configurable between a first position wherein said electrical input is placed in electrical communication with said first electrical output corresponding therewith, a second position wherein said electrical input configured to an open circuit;
a motor controller having an input in electrical communication with the first electrical output of said second electrical control switch, a control input, and an motor output;
a manually actuated throttle connected to said frame, said throttle having an output in electrical communication with said motor controller control input;
an electrically powered motorized transaxle assembly mounted on said frame, said motorized transaxle assembly including a DC motor having an output shaft mechanically connected to a transaxle assembly including opposing axel members, said DC motor in electrical communication with the motor output of said motor controller; and
a pair of wheels connected to said frame coupled to said transaxle assembly, said pair of wheels journaled for rotation about an axis.

2. A self-propelled pool service cart according to claim 1, further including a trailer adapted for removable attachment to said frame, said wheeled platform adapted for supporting a person.

3. A self-propelled pool service cart according to claim 1, wherein said frame includes a storage platform having a top surface defining upwardly projecting structure sized and shaped to be received within by a pool vacuum for nested mating engagement with the undersurface of the pool vacuum.

4. A self-propelled pool service cart comprising:
a frame including a handle;
a 12-Volt battery supported by said frame;
at least one electrical control switch having an electrical input in electrical communication with said battery, a manually actuated selector configurable between a plurality of positions including an "off" position wherein power is not drawn from said battery, a first "on" position wherein power is supplied to an electrical receptacle mounted to said frame, and a second "on" position wherein power is supplied to a motor controller;
said motor controller having a control input, and a motor output;

a manually actuated throttle connected having an output in electrical communication with said motor controller control input;

an electrically powered motorized transaxle assembly mounted on said frame, said motorized transaxle assembly including a 24-Volt DC motor having an output shaft mechanically connected to a transaxle assembly including opposing axel members, said DC motor in electrical communication with the motor output of said motor controller; and a pair of wheels, each of said wheels mechanically coupled one of said opposing axel members.

5. A self-propelled pool service cart according to claim 4, further including a trailer adapted for removable attachment to said frame, said wheeled platform adapted for supporting a person.

6. A self-propelled pool service cart according to claim 4, wherein said frame includes a storage platform having means for removably securing a swimming pool vacuum.

7. A self-propelled pool service cart comprising:
a frame including a handle;
said frame including a storage platform;
an electrically powered swimming pool vacuum removably supported on said storage platform;
means for securing said swimming pool vacuum on said storage platform;
a single 12-Volt battery supported by said frame and configured as a power supply;
at least one electrical control switch having an electrical input in electrical communication with said battery, a manually actuated selector configurable between a plurality of positions including an "off" position wherein power is not drawn from said battery, a first "on" position wherein power is supplied to an electrical receptacle mounted to said frame, and a second "on" position wherein power is supplied to a motor controller;
said motor controller having a control input, and a motor output;
a manually actuated throttle connected having an output in electrical communication with said motor controller control input;
an electrically powered motorized transaxle assembly mounted on said frame, said motorized transaxle assembly including a 24-Volt DC motor having an output shaft mechanically connected to a transaxle assembly including opposing axel members, said DC motor in electrical communication with the motor output of said motor controller; and
each opposing axel member having a wheel mechanically coupled thereto.

\* \* \* \* \*